United States Patent [19]

Takeuchi

[11] Patent Number: 5,356,194
[45] Date of Patent: Oct. 18, 1994

[54] WEATHER STRIP

[75] Inventor: Norio Takeuchi, Hiroshima, Japan

[73] Assignee: Nishikawa Rubber Co., Ltd., Hiroshima, Japan

[21] Appl. No.: 11,662

[22] Filed: Jan. 29, 1993

[30] Foreign Application Priority Data

Jan. 31, 1992 [JP] Japan .................. 4-046313

[51] Int. Cl.5 .................................. B60J 10/02
[52] U.S. Cl. .................... 296/146.9; 49/475.1
[58] Field of Search ............ 296/146.9, 146.1, 202; 49/475.1, 479.1, 495.1, 502; 293/126, 128

[56] References Cited

U.S. PATENT DOCUMENTS

| | | |
|---|---|---|
| 3,606,431 | 9/1971 | Kunevicius ............. 293/128 |
| 3,982,780 | 9/1976 | Keith ..................... 293/128 |
| 4,047,751 | 9/1977 | Koike .................... 296/146 F |
| 4,246,303 | 1/1981 | Townsend ............ 293/128 X |
| 4,542,926 | 9/1985 | Treber et al. ........ 293/128 |
| 5,154,952 | 10/1992 | Nozaki ................. 49/495.1 X |

Primary Examiner—Dean J. Kramer
Attorney, Agent, or Firm—Flynn, Thiel, Boutell & Tanis

[57] ABSTRACT

A weather strip capable of broadening a visual field from the inside of a car and comprising a retainer fixed to an opening edge of a body, the retainer being open downward and having a reverse U-shape in cross section and a weather strip body composed of a hollow seal portion which elastically contacts a door glass wherein the weather strip body is engaged with and stuck to the inner surface of the retainer by way of a double coated tape.

3 Claims, 3 Drawing Sheets

WEATHER STRIP

BACKGROUND OF THE INVENTION

1. Field of the Invention

The present invention relates to a weather strip for sealing a gap between an opening edge of a body and a door glass of a car, particularly of a hard top car.

2. Prior Art

A conventional weather strip will be described with reference to FIGS. 1 and 2. Denoted at 18 is an inside of a car and 19 is an outside of the car.

The weather strip comprises a weather strip body 80 composed of a base portion 82 and a hollow seal portion 81 which elastically contacts a door glass 20 and is integrally formed with the base portion 82 and a retainer 61 which is fastened to the opening edge 10 by a machine screw 63 wherein the base portion 82 is engaged with the retainer 61. Denoted at 62 is a trim fitting metal which protrudes from the outer tip end of the retainer 61 and 90 is an outer trim which is attached to the trim fitting metal 62.

However, there is such a problem in the conventional weather strip that the weather strip body 80 is attached to the opening edge portion 10 by way of a seat portion such as the retainer 61 and the base portion 82 of the weather strip body 80 etc. and this seat portion occupies large space, whereby the height from the lower end of the weather strip body 80 to the opening end 10 is extended, namely, the width Y of the weather strip body 80 is enlarged which narrows a visual field from the inside of the car 18.

SUMMARY OF THE INVENTION

It is therefore an object of the present invention to provide a weather strip which solved the problem of the conventional weather strip and capable of broadening the field vision from the inside of the car by having a reduced width profile.

To achieve the above object, the weather strip of the present invention comprises a retainer 11 fixed to an opening edge 10 of a body by a fixing member 13, the retainer 11 having a reverse U-shape in cross section and opening downward and a weather strip body 30 engaged with the retainer 11 and attached to the inner surface of the retainer 11 by way of a pressure sensitive adhesive double coated tape (hereinafter referred to as a double coated tape), the weather strip body 30 elastically contacting a door glass 20.

PREFERRED EMBODIMENT OF THE INVENTION

Figure 1:
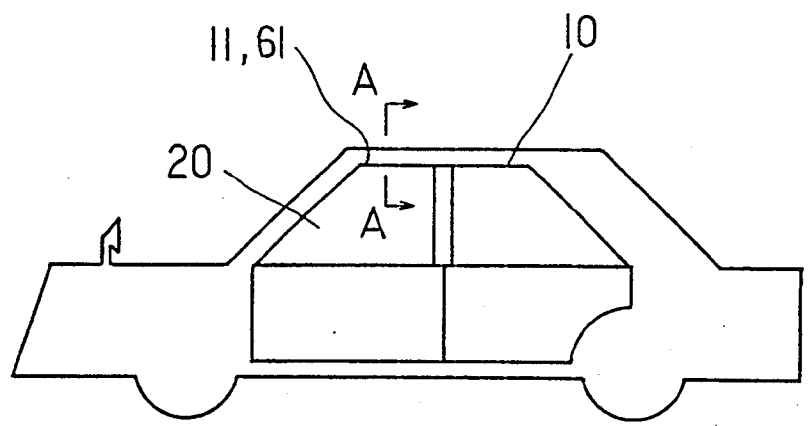
FIG. 1 is a side view of an automobile.
Figure 2:
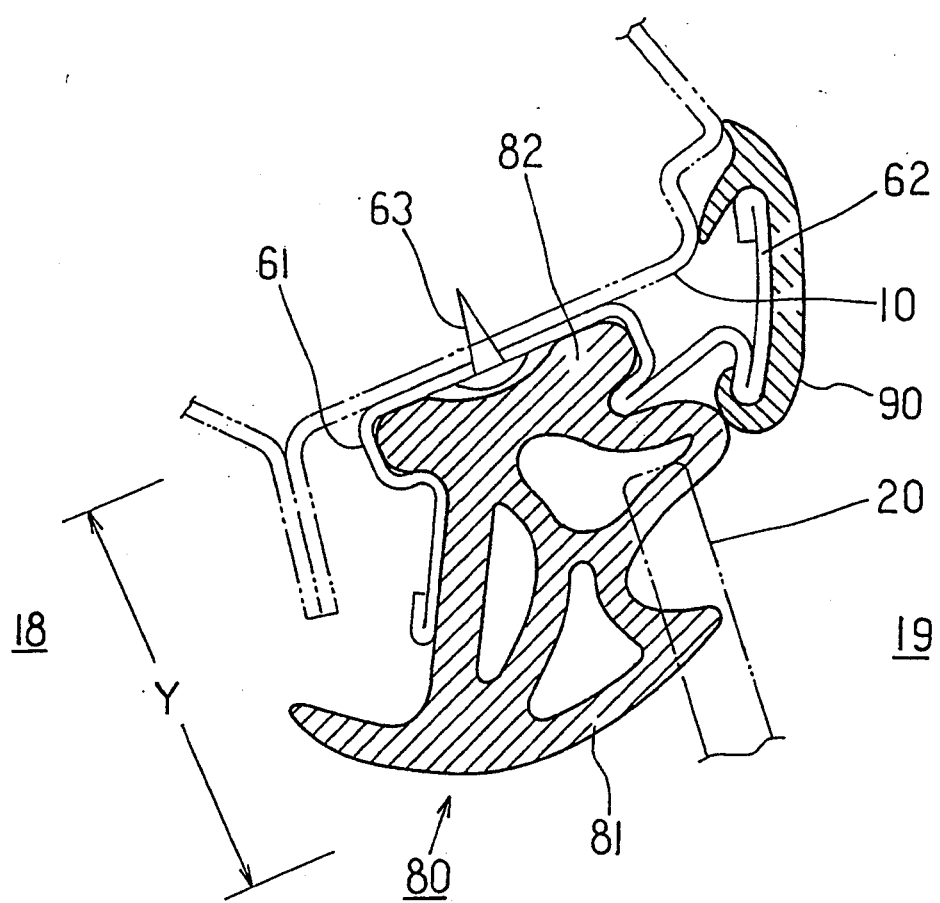
FIG. 2 is a cross-sectional view taken along A—A of a conventional weather strip in FIG. 1.
Figure 3:
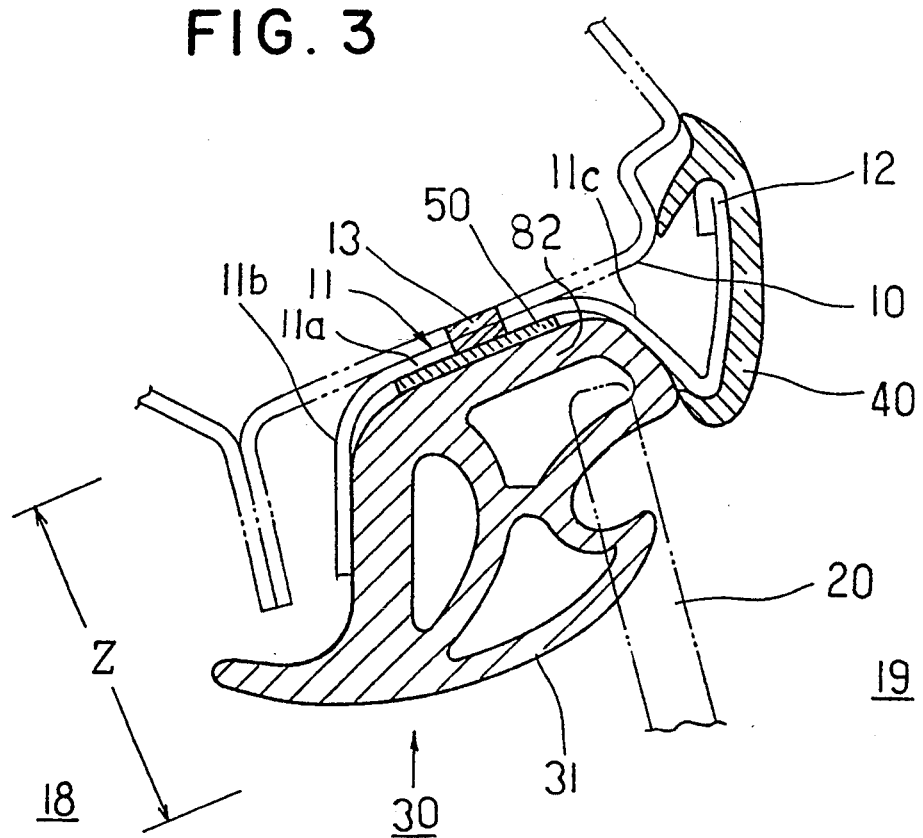
FIG. 3 is a cross-sectional view taken along A—A of a weather strip according to a first embodiment of the present invention in FIG. 1.
Figure 4:
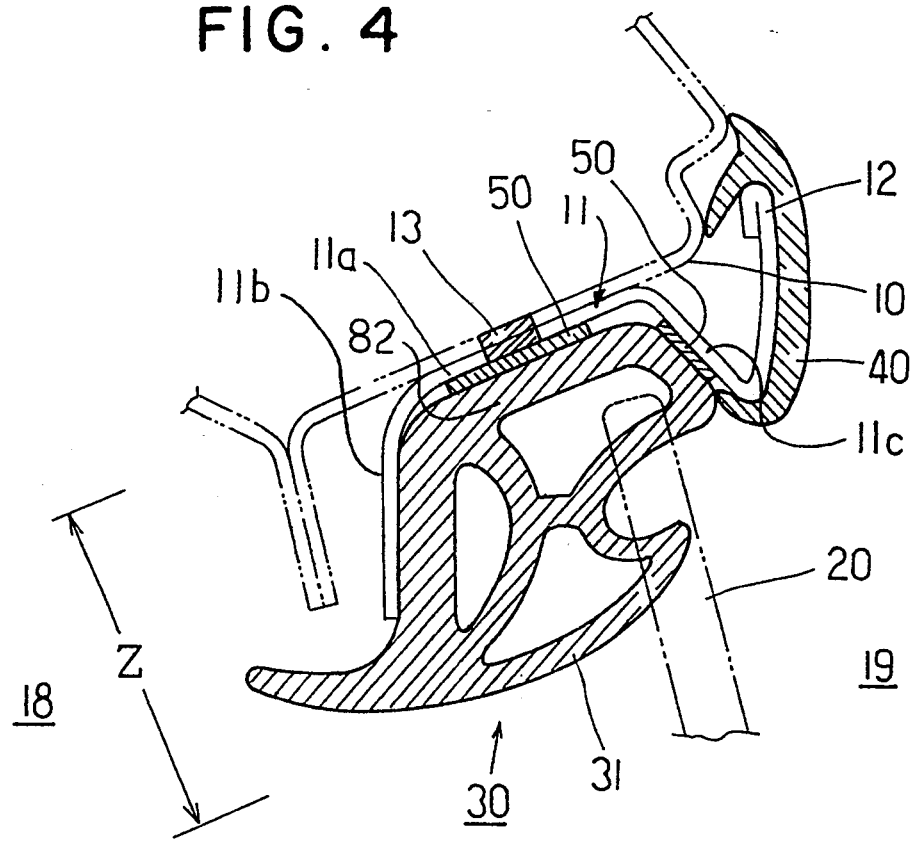
FIG. 4 is a cross-sectional view taken along A—A of a weather strip according to a second embodiment of the present invention in FIG. 1.
Figure 5:
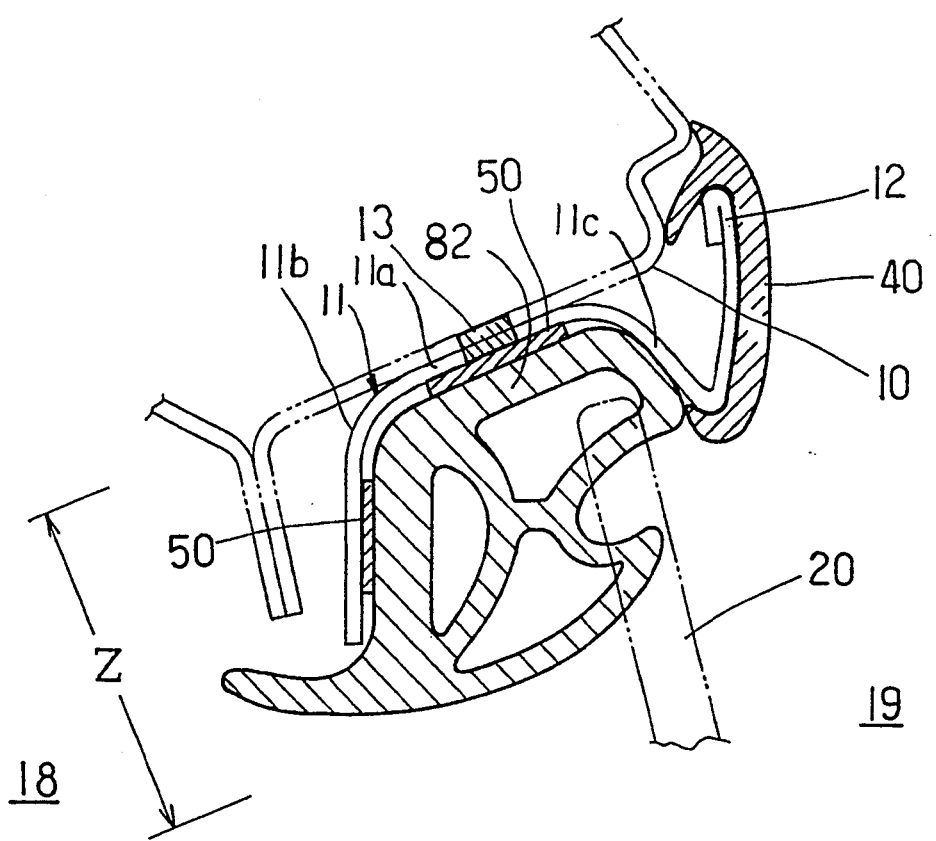
FIG. 5 is cross-sectional view taken along A—A of a weather strip according to a third embodiment of the present invention in FIG. 1.

A weather strip according to first to third embodiments of the present invention will be described with reference to FIGS. 1, 3 to 5.

The first to third embodiments comprise the same elements but there is a difference therebetween in respect of the number of portions where a double coated tape 50 is stuck.

Denoted at 10 is an opening edge of a car, 11 is a retainer which is fixed to the opening edge 10 by a machine screw, not shown, or a fixing means 13 such as welding and which opens downward and has an inverted substantially U-shaped cross section, 20 is a door glass, and 30 is a weather strip body for sealing a gap between the opening edge 10 and the door glass 20. Retainer 11 includes a central portion 11a, a first leg portion 11b which extends transversely toward the interior 18 of the car body from one end edge of the central portion, and a second leg portion 11c which extends transversely toward the exterior 19 of the car body from the other end edge of the central portion. The first and second leg portions diverge away from each other so that no under-cut regions are formed in the retainer. The weather strip body 30 comprises a hollow seal portion 31 alone which elastically contacts the door glass 20 and has a base portion or surface 82. The base surface of the hollow seal portion 31 is stuck to the inner base surface of the retainer 11 by way of a double coated tape 50. Denoted at 12 is a metal trim fitting and 40 is an outer trim member which is fitted to the metal trim fitting 12. The metal trim fitting 12 extends from a free end portion of the second leg portion 11c. The fitting 12 and the second leg 11c cooperate to define a substantially V-shaped member.

Since the weatherstrip body 30 is dispensed with a base portion 82, which has been conventionally formed therein, and the hollow seal portion 31 alone is fastened to the retainer 11 by the double coated tape 50, the vertical width Z of the weather strip body 30 is reduced so that the visual field can be broadened in proportion to the reduction of the width Z.

Furthermore, if the retainer 11 in directly welded to the opening edge, it is possible to prevent water from entering the gap between the opening edge 10 and a retainer 11.

What is claimed is:

1. A weather strip for sealing a gap between an opening edge of a car body and a door glass of a car door, the weather-strip comprising:

an inverted substantially U-shaped retainer having a central portion, and first and second divergent leg portions each extending away from a respective end edge of said central portion so that no undercut regions are formed in said retainer, said first leg portion extending in a first direction generally toward an interior of said car body and said second leg portion extending in a second direction generally toward an exterior of said car body;

a metal trim fitting extending transversely from a free end of said second leg portion, said metal trim fitting and said second leg portion cooperating to define a substantially V-shaped member;

means for securing said central portion to said opening edge of said car body;

a weather strip body having a base portion and a hollow seal portion which elastically contacts the door glass, said weather strip having a width profile reduced from a width value Y to a width value Z thus increasing an operator's field of vision through the door glass;

a pressure sensitive double sided adhesive tape disposed between said central portion of said retainer and said base portion of said weather strip, and between at least one of said first and second leg portions of said retainer and said weather strip to secure said weather strip to said retainer, said adhesive tape being the sole means for securing said weather strip to said retainer; and an outer trim member secured to said substantially V-shaped member.

2. The weather strip according to claim 1, wherein the means for securing includes a weld.

3. The weather strip according to claim 1, wherein the means for securing includes a machine screw.

* * * * *